(12) United States Patent
Hunt et al.

(10) Patent No.: US 9,862,488 B2
(45) Date of Patent: Jan. 9, 2018

(54) LOCATION VERIFICATION AND SECURE NO-FLY LOGIC FOR UNMANNED AERIAL VEHICLES

(71) Applicant: McAfee, Inc., Santa Clara, CA (US)

(72) Inventors: Simon Hunt, Naples, FL (US); Venkata Ramanan Sambandam, Sunnyvale, CA (US); Samir Shah, Santa Clara, CA (US)

(73) Assignee: MCAFEE, LLC, Santa Clara, CA (US)

( * ) Notice: Subject to any disclaimer, the term of this patent is extended or adjusted under 35 U.S.C. 154(b) by 94 days.

(21) Appl. No.: 14/839,395

(22) Filed: Aug. 28, 2015

(65) Prior Publication Data

US 2017/0057634 A1    Mar. 2, 2017

(51) Int. Cl.
| | |
|---|---|
| B64C 39/02 | (2006.01) |
| G01S 19/42 | (2010.01) |
| G08G 5/00 | (2006.01) |
| H04L 9/32 | (2006.01) |
| H04L 9/30 | (2006.01) |
| G06F 21/00 | (2013.01) |
| H04W 4/02 | (2009.01) |

(Continued)

(52) U.S. Cl.
CPC .......... *B64C 39/024* (2013.01); *G01S 19/215* (2013.01); *G01S 19/42* (2013.01);
(Continued)

(58) Field of Classification Search
CPC ........ B64C 2201/027; B64C 2201/141; B64C 39/024; B64C 2201/145; G01S 19/42;
(Continued)

(56) References Cited

U.S. PATENT DOCUMENTS

| | | |
|---|---|---|
| 8,644,512 B2 | 2/2014 | Khazan et al. |
| 8,989,922 B2 | 3/2015 | Jones et al. |

(Continued)

FOREIGN PATENT DOCUMENTS

WO    2012125600    9/2012

OTHER PUBLICATIONS

International Searching Authority, Written Opinion, issued in connection with the International Application No. PCT/US2016/046026, dated May 23, 2017, 12 pages.

(Continued)

*Primary Examiner* — Thai Tran
*Assistant Examiner* — Stephen Smith
(74) *Attorney, Agent, or Firm* — Hanley, Flight & Zimmerman, LLC

(57) ABSTRACT

Certain embodiments herein relate to location verification for autonomous unmanned aerial vehicles (also referred to as "drones"). In some embodiments, an unmanned aerial vehicle engaged in autonomous flight may determine its location using a satellite-based navigation system. The location may be evaluated against location data obtained from one or more secondary factors, such as public broadcast beacons, cellular towers, wireless network identifiers, visual markers, or any combination thereof. If the location is determined to be invalid, the unmanned aerial vehicle may be instructed to take a mitigation action. Additionally, certain embodiments also include the verification of a flight plan for the unmanned aerial vehicle using secure no-fly logic to verify a flight plan does not violate no-fly zones. If the flight plan is verified, the flight plan may be signed using a cryptographic signature and provided to a navigation module that verifies the signature and executes the flight plan.

10 Claims, 8 Drawing Sheets

(51) Int. Cl.
*H04W 4/04* (2009.01)
*G01S 19/21* (2010.01)
*G06F 21/60* (2013.01)

(52) U.S. Cl.
CPC ............ *G06F 21/00* (2013.01); *G06F 21/606* (2013.01); *G08G 5/006* (2013.01); *G08G 5/0013* (2013.01); *G08G 5/0021* (2013.01); *G08G 5/0034* (2013.01); *G08G 5/0052* (2013.01); *G08G 5/0069* (2013.01); *G08G 5/0082* (2013.01); *H04L 9/302* (2013.01); *H04L 9/3249* (2013.01); *H04W 4/021* (2013.01); *H04W 4/046* (2013.01); *B64C 2201/027* (2013.01); *B64C 2201/141* (2013.01)

(58) Field of Classification Search
CPC ....... G01S 19/38; G08G 5/0034; H04L 9/302; H04L 9/3249; H04W 12/04
USPC .............. 342/36; 701/3, 469, 24, 16, 11, 25; 382/218; 244/17.23; 348/144; 386/248
See application file for complete search history.

(56) References Cited

U.S. PATENT DOCUMENTS

| | | | |
|---|---|---|---|
| 2010/0010741 A1* | 1/2010 | Tener | F41G 7/34 701/500 |
| 2010/0280699 A1 | 11/2010 | Bageshwar et al. | |
| 2011/0163908 A1* | 7/2011 | Andersson | G01S 5/0072 342/36 |
| 2012/0277934 A1* | 11/2012 | Ohtomo | G05D 1/0669 701/15 |
| 2014/0018979 A1 | 1/2014 | Goossen et al. | |
| 2014/0022121 A1* | 1/2014 | Donovan | G01C 21/165 342/357.49 |
| 2014/0067164 A1* | 3/2014 | Papadopoulos | B64G 1/002 701/3 |
| 2015/0046017 A1* | 2/2015 | Torti | G05D 1/0011 701/25 |
| 2015/0158599 A1* | 6/2015 | Sisko | B64F 1/32 244/114 R |
| 2015/0203213 A1* | 7/2015 | Levien | G01C 21/00 701/486 |
| 2015/0225081 A1* | 8/2015 | Stabler | B64C 39/024 701/3 |
| 2015/0370251 A1* | 12/2015 | Siegel | G05D 1/0027 701/2 |
| 2016/0122038 A1* | 5/2016 | Fleischman | G06T 7/73 701/2 |
| 2016/0299233 A1* | 10/2016 | Levien | G01C 21/00 |
| 2016/0376031 A1* | 12/2016 | Michalski | B64F 1/36 701/15 |
| 2017/0011333 A1* | 1/2017 | Greiner | G06Q 10/083 |

OTHER PUBLICATIONS

International Searching Authority, International Search Report, issued in connection with the International Application No. PCT/US2016/046026, dated May 23, 2017, 3 pages.

* cited by examiner

LOCATION VERIFICATION AND SECURE NO-FLY LOGIC FOR UNMANNED AERIAL VEHICLES

BACKGROUND

With the advent of modern technology, unmanned aerial vehicles (UAV's), also referred to as drones, have become widely available for military use, commercial use, and consumer use. As drones become more widespread, the potential as a target for hacking or other attempts to control, divert, or otherwise interfere with operation or flight of the drone is likely to increase. In particular, autonomous drones may be a desirable target for such attempts. Moreover, the implementation of flight paths that ignore flight restrictions (such as restricted airspace above or near an airport) may be another challenge. Some drone components, such as open-source hardware and/or software, may be susceptible to attempts by a user, a hacker, or other persons to implement such flight paths.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments herein relate to, among other things, location verification for autonomous unmanned aerial vehicles (also referred to as "drones"). In some embodiments, an unmanned aerial vehicle engaged in autonomous flight may determine its location using a satellite-based navigation system. The location may be evaluated using an initial validation to determine whether the location is valid. If the location is not valid, the location may be further evaluated against location data obtained from one or more secondary factors, such as public broadcast beacons, cellular towers, wireless network identifiers, visual markers, or any combination thereof. If the location is determined to be invalid, the unmanned aerial vehicle may be instructed to take a mitigation action. If the location is determined to be valid, the location may be stored and the unmanned aerial vehicle may continue autonomous flight.

In some embodiments, the flight plan for an unmanned aerial vehicle may be verified using secure no-fly logic. A no-fly zone control module may be implemented as a platform enclave stored in the memory of an unmanned aerial vehicle. The NFZC module may obtain no-fly zone data from a server or use previously stored no-fly zone data to verify a flight plan does not violate any known no-fly zones. If the flight plan is verified, the flight plan may be signed using a cryptographic signature associated with the NFZC enclave. The signed flight plan is provided to a navigation module that verifies the signature and executes the flight plan. If the flight plan is not verified, the navigation module is not able to verify the flight plan and the flight plan is not used by the navigation module.

Figure 1:
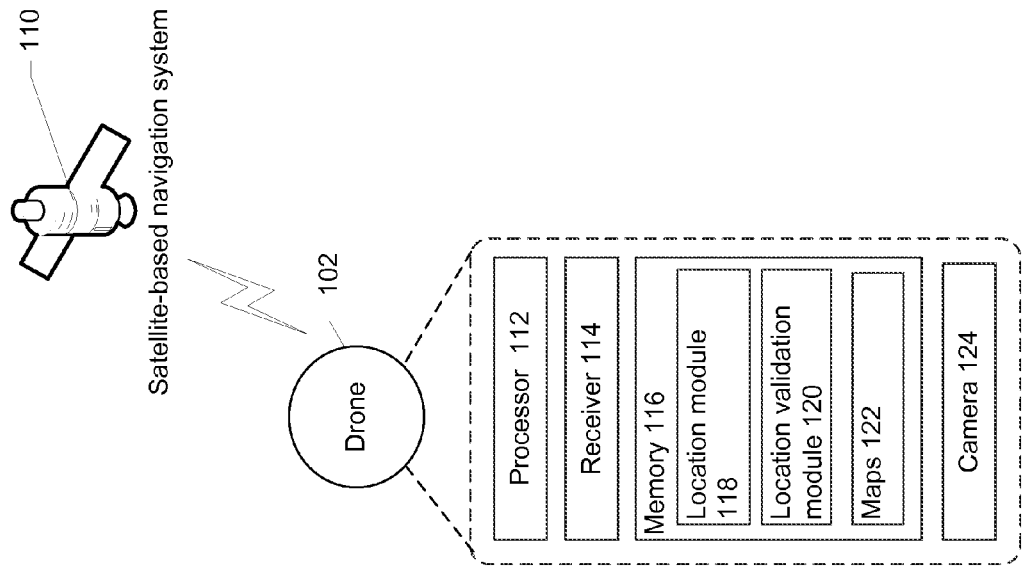
FIG. 1 is a schematic diagram of an environment illustrating a drone engaged in autonomous flight in accordance with an example embodiment of the disclosure.
Figure 1:
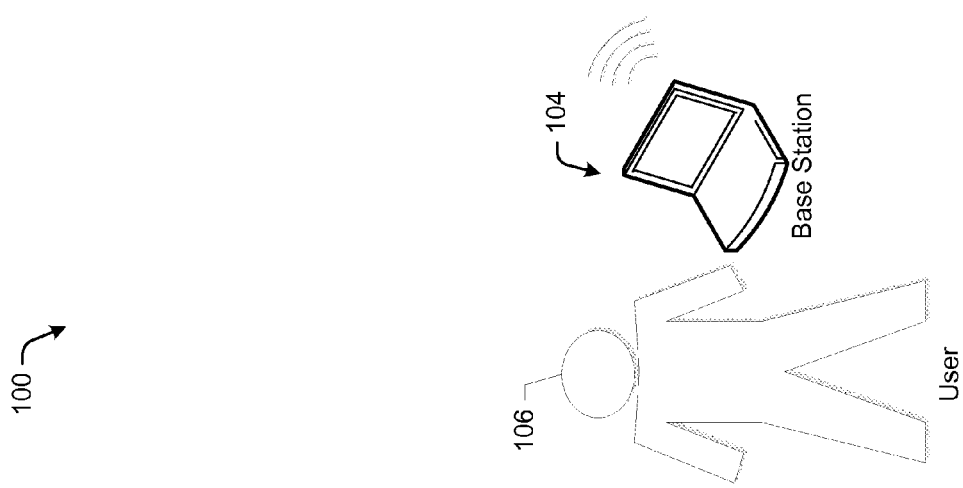

FIG. 1 depicts an environment 100 illustrating an unmanned aerial vehicle 102 engaged in autonomous flight in accordance with an embodiment of the disclosure. In some embodiments, the unmanned aerial vehicle 102 may be associated with and, in some embodiments may communicate with, a base station 104. In some embodiments, a user 106 may communicate with the unmanned aerial vehicle 102 via the base station 104. In some embodiments, the unmanned aerial vehicle 102 may also be capable of being remotely piloted by the user 106 via the base station 104.

The unmanned aerial vehicle 102 may communicate with a satellite-based navigation system 110 to determine its location. For example, the unmanned aerial vehicle 102 may engage in autonomous flight using locations determined using the satellite-based navigation system 110, such as via the use of a flight plan having one or more predetermined locations.

FIG. 1 depicts various components of the unmanned aerial vehicle 102, although it should be appreciated that various components are omitted and embodiments of the unmanned aerial vehicle 102 may include additional components not illustrated in FIG. 1. As shown in FIG. 1, the unmanned aerial vehicle 102 may include a processor 112 (e.g., one or more processors), a receiver 114 (e.g., one or more receivers) and a memory 116 (e.g., one or more memories). The processor 112 may provide the processing capability to execute the operating system, programs, user interface, and other functions of the unmanned aerial vehicle 102. For example, the processor 112 may execute various modules stored in the memory 116 and provide commands to the unmanned aerial vehicle 102, such as for navigation and flight. The processor 112 may include one or more processors and may include microprocessors, application-specific integrated circuits (ASICs), or any combination thereof. In some embodiments, the processor 112 may include one or more reduced instruction set (RISC) processors, such as those implementing the Advanced RISC Machine (ARM) instruction set. Additionally, the processor 112 may include single-core processors and multicore processors and may include graphics processors, video processors, and related chip sets. Multiple processors may be employed to provide for parallel or sequential execution of the techniques described herein. Processes, such as logic described herein may be performed by the processor 112 executing one or more computer programs to perform functions by operating on input data and generating corresponding output.

The receivers 114 may include any number of receivers for communication using suitable wireless communication protocols and technologies. For example, the receiver 114 may include a receiver for communication with a satellite-based navigation system (e.g., the Global Positioning System (GPS), Global Navigation Satellite System (GLONASS), Galileo, etc.).

The memory 116 (which may include one or more tangible non-transitory computer readable storage mediums) may include volatile memory, such as random access memory (RAM), accessible by the processor 112 and other components of the unmanned aerial vehicle 102. For example, the memory 116 may store executable computer code, such as the firmware for the unmanned aerial vehicle 102, an operating system for the unmanned aerial vehicle 102, and any other programs or other executable code for providing functions of the unmanned aerial vehicle 102.

The memory 116 may include various modules and other components for enabling operation and flight of the unmanned aerial vehicle 102. For example, as shown in FIG. 1, the memory 116 may include a location module 118 that determines the location of the unmanned aerial vehicle 102 using the satellite-based navigation system 110. The memory 116 may also include a location verification module 120 that verifies the location determined from the satellite-based navigation system 110 in accordance with the techniques described herein. In some embodiments, the memory 116 may also store maps 122 usable by the location verification module 120 or other modules or components of the unmanned aerial vehicle 102. In some embodiments, the maps 122 may include a map of public broadcast beacons, a topological map, or other maps. In some embodiments, the maps 122 may be generated by the unmanned aerial vehicle 102 during a previous survey along a flight path, such as by identifying visual markers along the flight path, identify the locations of wireless network identifiers along the flight path, and so on.

In some embodiments, the unmanned aerial vehicle 102 may also include a camera 124. For example, the camera 124 may capture still images, video, or both of areas surrounding the unmanned aerial vehicle 102 (e.g., the ground beneath the unmanned aerial vehicle, the area in front the unmanned aerial vehicle, etc.). In some embodiments, the camera 124 may be of sufficient resolution to enable image-recognition performed on objects captured in the camera's field of view.

Figure 2:
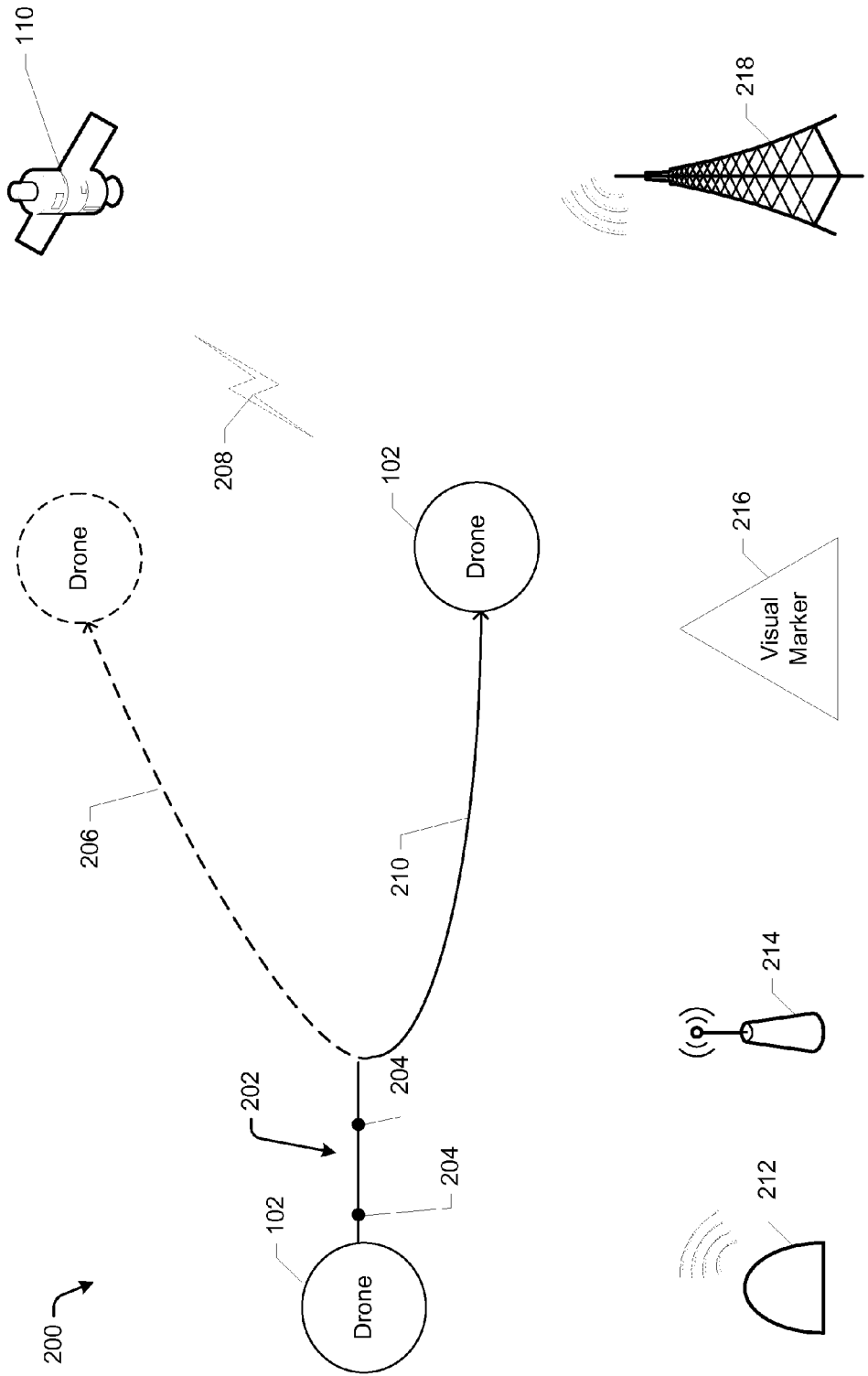
FIG. 2 is a schematic diagram depicting an environment illustrating location verification of the drone of FIG. 1 in accordance with an example embodiment of the disclosure.

FIG. 2 depicts an environment 200 illustrating location verification of the unmanned aerial vehicle 102 in accordance with an embodiment of the disclosure. As described above, the unmanned aerial vehicle 102 may follow a flight plan using locations determined from a satellite-based navigation system 110. For example, the unmanned aerial vehicle 102 may autonomously fly along a flight path portion 202 and may determine and verify locations 204 along the flight path portion 202. FIG. 2 also illustrates an intended flight path portion 206 of the unmanned aerial vehicle 102. However, in some environments a signal allegedly received from the satellite-based navigation system 110 may instead be a spoofed signal 208 that may relay incorrect navigation data to the unmanned aerial vehicle 102. Thus, instead of following the intended flight path portion 206, the unmanned aerial vehicle 102 may fly along actual flight path portion 210 as a result to the incorrect navigation data provided by the spoofed signal 208. Thus, the position determinations performed by the unmanned aerial vehicle 102 may result in the unmanned aerial vehicle 102 determining that it is at a location along intended flight path 206, when the actual position of the unmanned aerial vehicle 102 is along actual flight path 210. For example, a spoofed signal transmitted 100 meters north of an actual satellite-based navigation system signal could cause the unmanned aerial vehicle 102 to deviate from an intended flight path such that the unmanned aerial vehicle may unable to complete a task, may crash into an obstruction, land in an unsafe landing area (e.g., a roadway) and so on. It should be appreciated that the spoofed signal 208 is merely one example of an event that may cause the unmanned aerial vehicle 102 to deviate from the intended flight plan and, in other embodiments, other events may cause similar deviations. For example, other events may include broadcast attacks that also cause the unmanned aerial vehicle to deviate from the intended flight path portion 206.

As described below, the unmanned aerial vehicle 102 may rely on additional data captured by the unmanned aerial vehicle 102 to validate the location determined from the satellite-based navigation data. The capture of location data may involve the use of secondary factors different from a satellite-based navigation system and described further below. Thus, if the location validation module 120 of the unmanned aerial vehicle 102 determines a conflict between the location data and the location determined from the satellite-based positioning data, various actions may be taken by the unmanned aerial vehicle 102.

FIG. 2 depicts multiple sources of location data that may be used by the unmanned aerial vehicle 102 to validate its location. In some embodiments, the secondary factors may include a public broadcast beacon 212, a wireless access point 214, visual markers 214 below or around the unmanned aerial vehicle, and a cellular tower 216. Additionally, other sources of data may include weather information received from publicly available weather sources, the location and distance to the unmanned aerial vehicle's base station, and other suitable sources. The additional location data may be used to validation a location determined from the satellite-based navigation data. If the location is not valid, a mitigation action may be taken by the unmanned aerial vehicle, as described further below.

Figure 3:
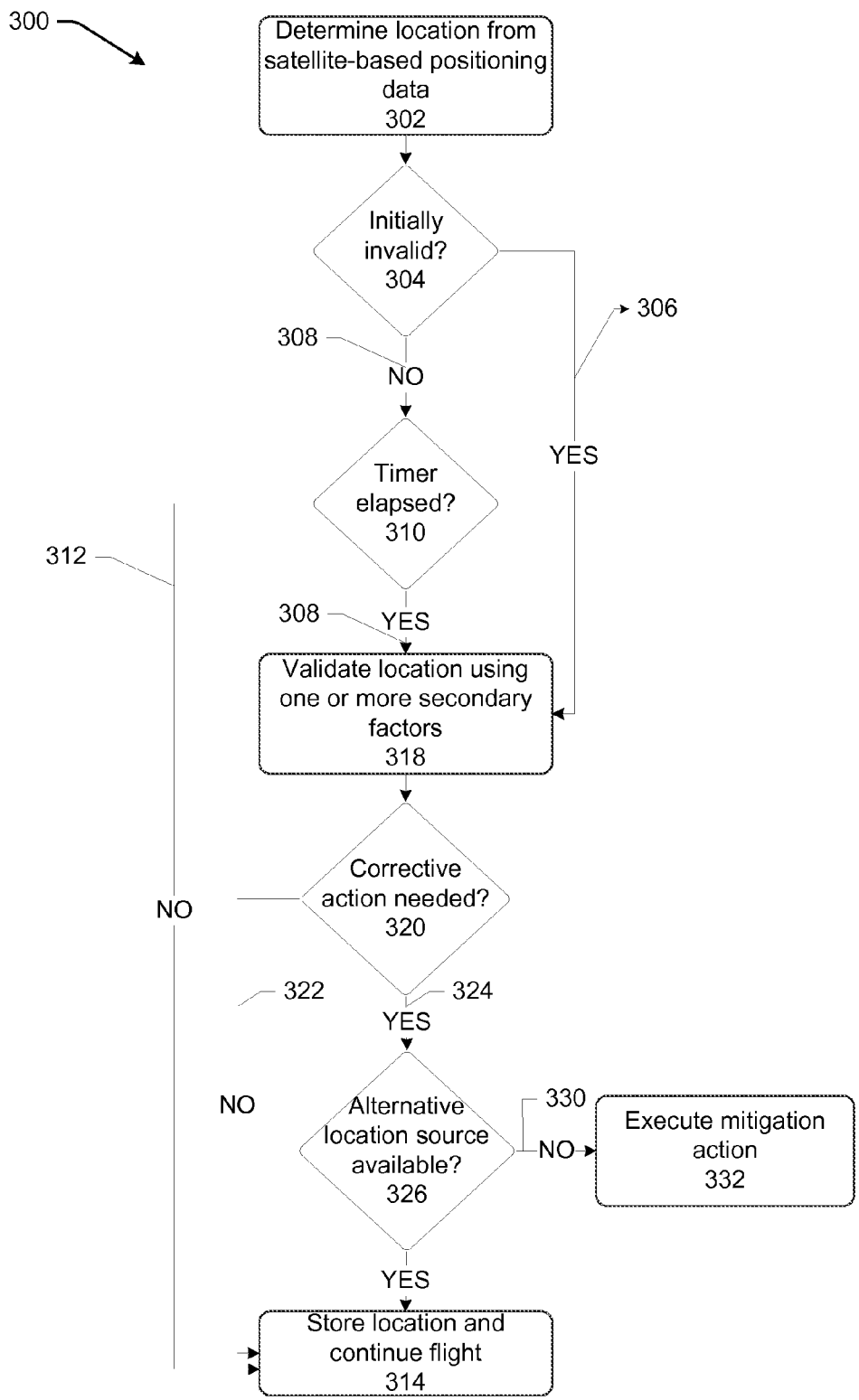
FIG. 3 is a block diagram of a process for determining whether to validate a location of a drone determined from satellite-based positioning data in accordance with an example embodiment of the disclosure.

FIG. 3 depicts a process 300 for determining whether to validate a location in accordance with an embodiment of the disclosure. In some embodiments, some or all steps of the process 300 may be implemented in the location module 118, the location validation module 120, or a combination thereof.

Initially, as described above, the location of an autonomous unmanned aerial vehicle may be determined from satellite-based positioning data (block 302). The location is evaluated using an initial validation to determine if the location is invalid (block 304). In some embodiments, the initial validation includes comparing the location to a signal received from the unmanned aerial vehicle's base station. The difference between the location and data derived from or in the signal may be compared to each other or to a threshold. In some embodiments, the distance between the location and the base station and the unmanned aerial vehicle's range may be compared. For example, if the location indicates the unmanned aerial vehicle is 100 kilometers from the base station but the unmanned aerial vehicle's range is only 2 km, the location may be determined to be invalid under the primary invalidation.

If the location is invalid under the initial validation (line 306), then the location is validated using one or more secondary factors, as described further in FIG. 4. If the determined location is not invalid under the initial validation (line 308), then a timer is evaluated to determine whether a time interval has elapsed (block 310). The timer may be a part of the location validation module 120 described above. The timer may specify a time interval for performing a location validation, regardless of whether the initial validation determined a valid location. Accordingly, at every time interval indicated by the timer, the location of the unmanned aerial vehicle may be validating using the secondary factors in the manner described herein. In some embodiments, the time (and the timer interval) may be configured by a user or may be configured for a specific unmanned aerial vehicle, base station, etc. If the timer has not elapsed (line 312), the determined location may be stored by the unmanned aerial vehicle and the unmanned aerial vehicle may continue autonomous flight (block 314).

If the timer has elapsed (line 316), the location may be validated using one or more secondary factors (block 318), as described in FIG. 4. The validation using the one or more secondary factors may determine whether corrective action is needed by the unmanned aerial vehicle (block 320). If corrective action is not needed (line 322), the determined location may be stored by the unmanned aerial vehicle and the unmanned aerial vehicle may continue autonomous flight (block 314).

If corrective action is needed (line 324), the availability of an alternative location source may be determined (block 326). In some embodiments, the determination of an alternative location source may include evaluation of the accuracy and confidence of a location determined from one or more secondary factors, as described below. If an alternative location source is available (line 328), the alternatively determined location may be stored by the unmanned aerial vehicle and the unmanned aerial vehicle may continue autonomous flight (block 314). For example, in some embodiments an alternative location source may a secondary factor such as one or more public broadcast beacons. If a location determined from one or more public broadcast beacons exceeds an accuracy threshold and a confidence threshold, the one or more public broadcast beacons may be used as an alternative location source. If an alternative location source is not available (line 330), then the unmanned aerial vehicle may be instructed to execute a mitigation action (block 332).

Figure 4A:
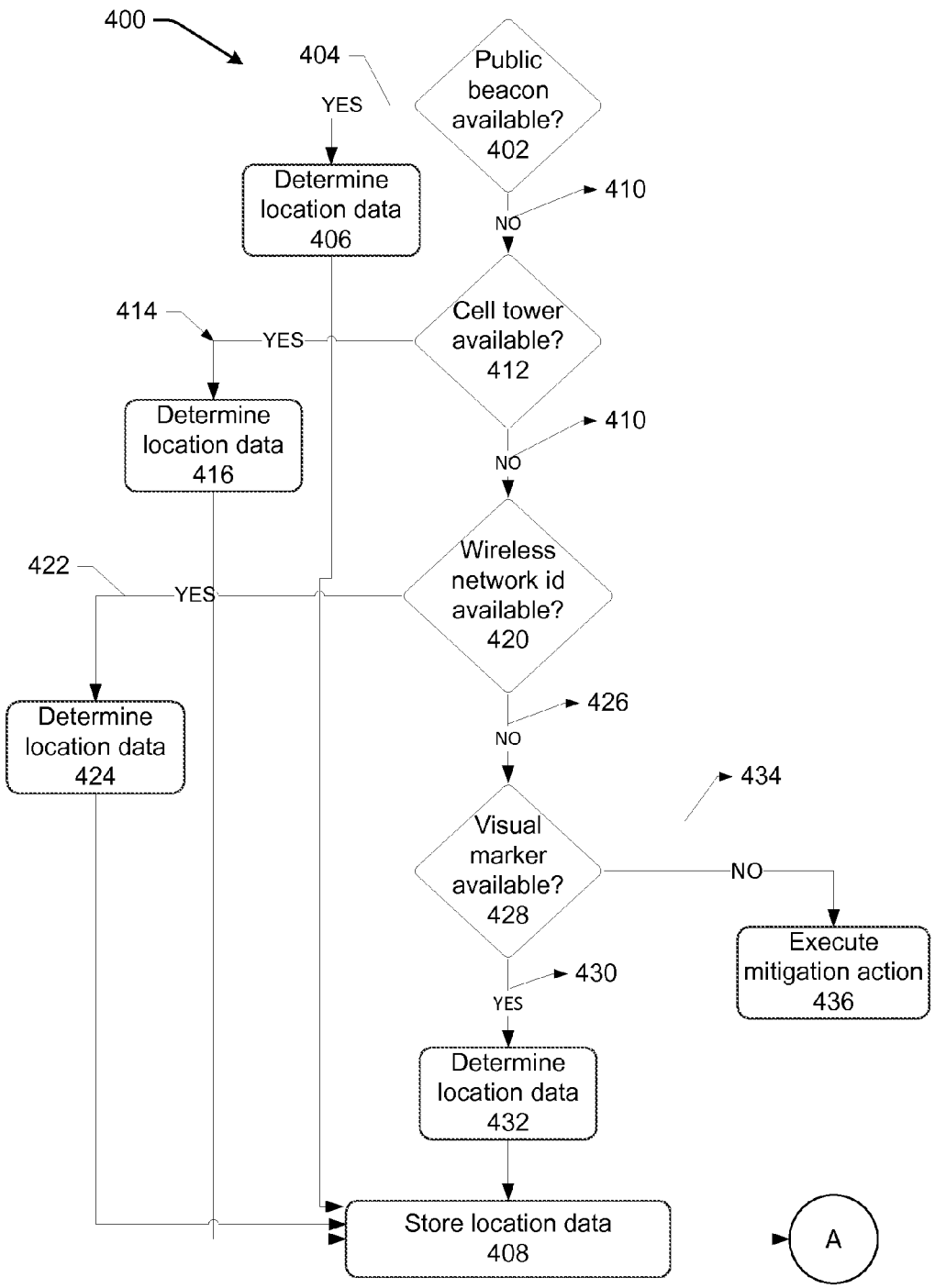
FIGS. 4A-B are block diagrams of a process for determining a process for validating a location of a drone determined from satellite-based positioning data in accordance with an example embodiment of the disclosure.
Figure 4B:
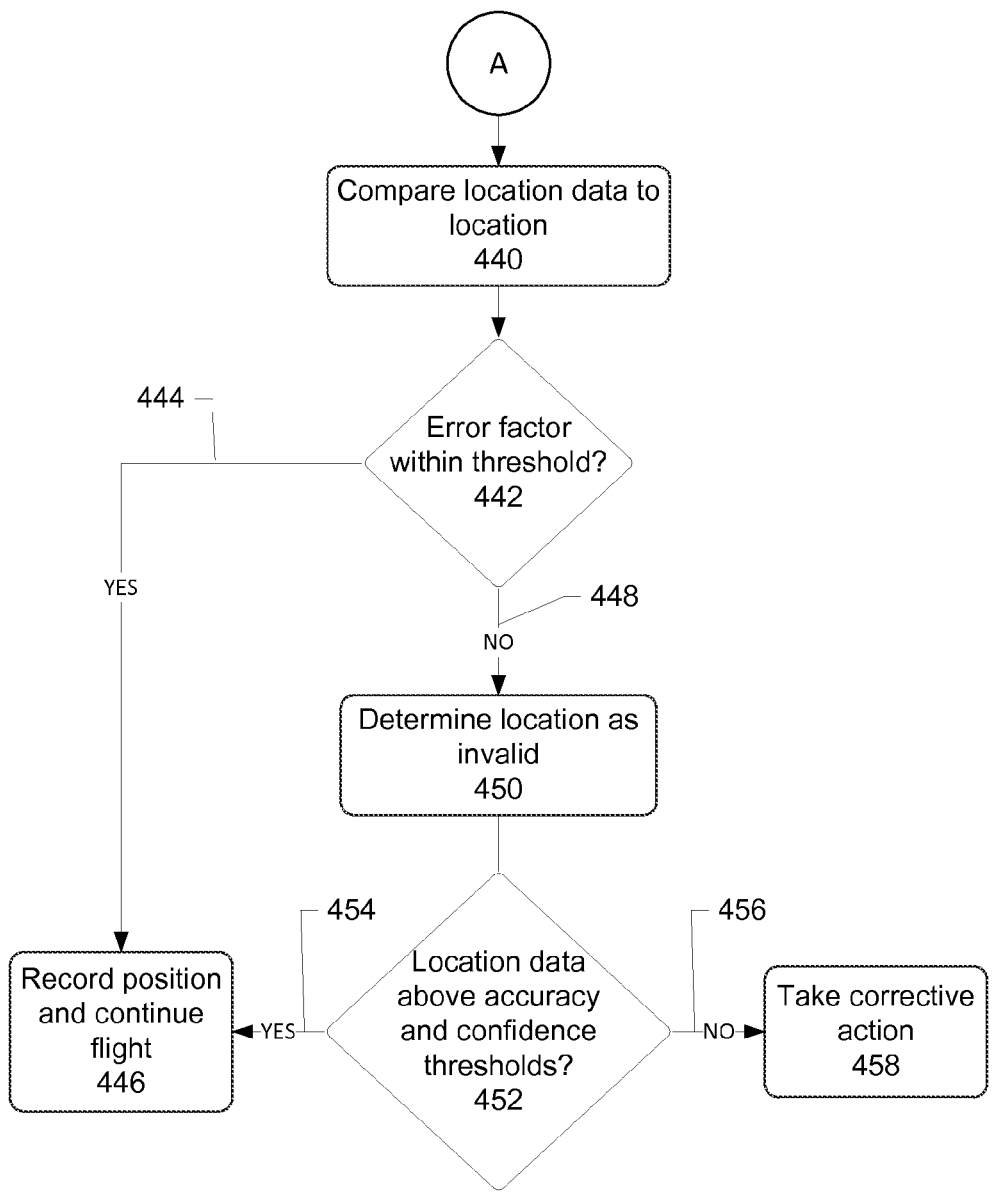

FIGS. 4A and 4B depict a process 400 for validating a location determined from satellite-based positioning data using secondary factors in accordance with an embodiment of the disclosure. In some embodiments, some or all steps of the process 300 may be implemented in the location module 118, the location validation module 120, or a combination thereof.

Initially, as shown in FIG. 4A, the availability of one or more public broadcast beacons may be determined (block 402), such as by evaluating signals broadcast by the one or more public broadcast beacons. Such public broadcast beacons may include public broadcast beacons specifically for unmanned aerial vehicle navigation and location determinations. If one or more public broadcast beacons are available (line 404), location data may be determined using the public broadcast beacons (block 406) and the location data may be stored (block 408). In some embodiments, the available one or more public broadcast beacons may be compared to a stored map (e.g., map 122) of public broadcast beacons to determine location data. In some embodiments, the map may include the range of one or more public broadcast beacons.

If one or more public broadcast beacons are not available (line 410), then the availability of one or more cellular towers for a location determination may be determined (block 412). If one or more cellular towers are available (line 414), location data may be determined using the cellular towers (block 416) and the location data may be stored (block 408). In some embodiments, the available one or more cellular towers may be compared to a stored map (e.g., map 122) of cellular towers to determine location data. In some embodiments, the map may include the range of one or more cellular towers.

If one or more cellular towers are not available (line 418), then the availability of one or more wireless network identifiers (e.g., a Service Set Identifier (SSID) transmitted from a wireless access point) for a location determination may be determined (block 420). If one or more wireless network identifiers are available (line 422), location data may be determined using the one or more wireless network identifiers (block 424) and the location data may be stored (block 426). In some embodiments, the available one or more wireless network identifiers may be compared to a stored map (e.g., map 122) of wireless network identifiers to determine location data. In some embodiments, the map may include the range of one or more wireless network identifiers.

If one or more wireless network identifiers are not available (line 426), then the availability of one or more visual markers for a location determination may be determined (block 428). In some embodiments, the visual markers may be captured by a camera (e.g., camera 122) of the unmanned aerial vehicle 102. For example, as an unmanned aerial vehicle flies over a landscape, the camera may capture visual markers such as landmarks, buildings, natural topographical features (e.g., rivers, lakes, mountains, etc.) and the like. If one or more visual markers are available (line 430), location data may be determined using the one or more wireless network identifiers (block 432) and the location data may be stored (block 426). For example, a visual marker may be compared to a topographical map having various markers to determine location data.

If one or more visual markers are not available (line 434), then the unmanned aerial vehicle may be instructed to execute a mitigation action (block 436). The mitigation actions may include, for example, immediately landing the unmanned aerial vehicle (e.g., turning on an unmanned aerial vehicle camera and attempt to land safely without the use of satellite-based positioning data), returning to the last location validated by a minimum number of secondary factors (e.g., returning to one of the locations 204 illustrated in FIG. 2), returning to the base station, sending a request to the base station for human-controlled flight, or self-destruction. In some embodiments, the mitigation actions may be selected or prioritized by a user or for a specific type of unmanned aerial vehicle, base station etc.

In other embodiments, additional or alternative secondary factors may be used to obtain location data. In some embodiments, the range from a base station associated with the unmanned aerial vehicle may be used as location data. In some embodiments, the current weather conditions at the determined location may be used as location data. Additionally, in some embodiments a secondary factor may be disabled by a user such the secondary factor is not used in the location validation.

In some embodiments, the priority of secondary factors used for location data may be specified by a user or for a specific type of unmanned aerial vehicle, base station etc. For example, public broadcast beacons may be prioritized over cellular towers, cellular towers may be prioritized over wireless network identifiers, and so on. In some embodiments, the number of secondary factors used for location data may be specified by a user or for a specific type of unmanned aerial vehicle, base station etc.

In some embodiments, a minimum number of available secondary factors may be specified by a user or for a specific type of unmanned aerial vehicle, base station etc. For example, a user could configure the location validation module such that the determined location may only be invalidated if location data from at least two secondary factors shown an error with the location. In some embodiments, the minimum number of secondary factors may be based on the initial validation described above. For example, if the initial validation first invalidates the location, location data from only secondary factor may be used. In yet other embodiments, a minimum number of individual secondary factors may be specified by a user or for a specific type of unmanned aerial vehicle, base station etc. For example, in such embodiments at least two Wi-Fi SSID's, at least two public broadcast beacons, etc. may be needed before the secondary factor may be used for location data.

As shown by connector block A, the process 400 continues in FIG. 4B. As shown in FIG. 4B, the stored location data may be compared to the location determined from the satellite-based positioning data (block 440) to determine an error factor and, in some embodiments, a confidence value associated with the error factor. In such embodiments, the distance between the determined location and one or more secondary factors and a range associated with the one or more secondary factors (e.g., public broadcast beacon, cellular tower, wireless network identifier, base) may be used to determine an error factor. For example, if the unmanned aerial vehicle can detect a Wi-Fi identifier up to 300 ft away but the location and stored map indicates the unmanned aerial vehicle is 1000 ft from the Wi-FI network associated with the identifier, an error factor may be determined.

In some embodiments, the error factor may be a distance. In some embodiments, the error factor may be a multiple of the difference between the location and the location data determined from one or more available secondary factors. In some embodiments, the error factor may be an average of error factors associated with two or more secondary factors, a weighted average of error factors associated with two or more secondary factors, and so on. In some embodiments, the visual marker secondary factor may be compared to a stored map that includes the determined location to determine an error factor. For example, if the determine location on a stored map is over a road but the visual marker indicates a building, an error factor may be determined. In some embodiments, the confidence value may be determined from a particular secondary factor, as some secondary factors may have a higher confidence value for an error factor determination than other secondary factors.

The error factor may be compared to a threshold (block 442) to determine whether the location is valid. In some embodiments, the threshold may be selected based on a particular secondary factor, a confidence value, or both. If the locations are within the threshold (line 444), the location is determined to be valid and the unmanned aerial vehicle may store the location and continue autonomous flight (block 446).

If the error factor is above the threshold (line 448), the location may be determined to be invalid (block 450). In some embodiments, the location data may be evaluated to determine if the location data exceeds an accuracy threshold and a confidence threshold (block 452). For example, a wireless network identifier may have a range of 100 ft and may thus provide location data at a granularity in the 100s of ft. In contrast, a visual marker may be viewable at a 1000 ft and may thus provide location data at a granularity in the 1000s of ft.

If the location data is above the accuracy threshold and the confidence threshold (line 454), the secondary location may recorded and the unmanned aerial vehicle may continue autonomous flight (block 446). If the secondary location is not above the accuracy threshold and confidence threshold (line 456), corrective action may be taken (block 458), as described in block 320 and the corresponding portions of the process 300 illustrated in FIG. 3.

Figure 5:
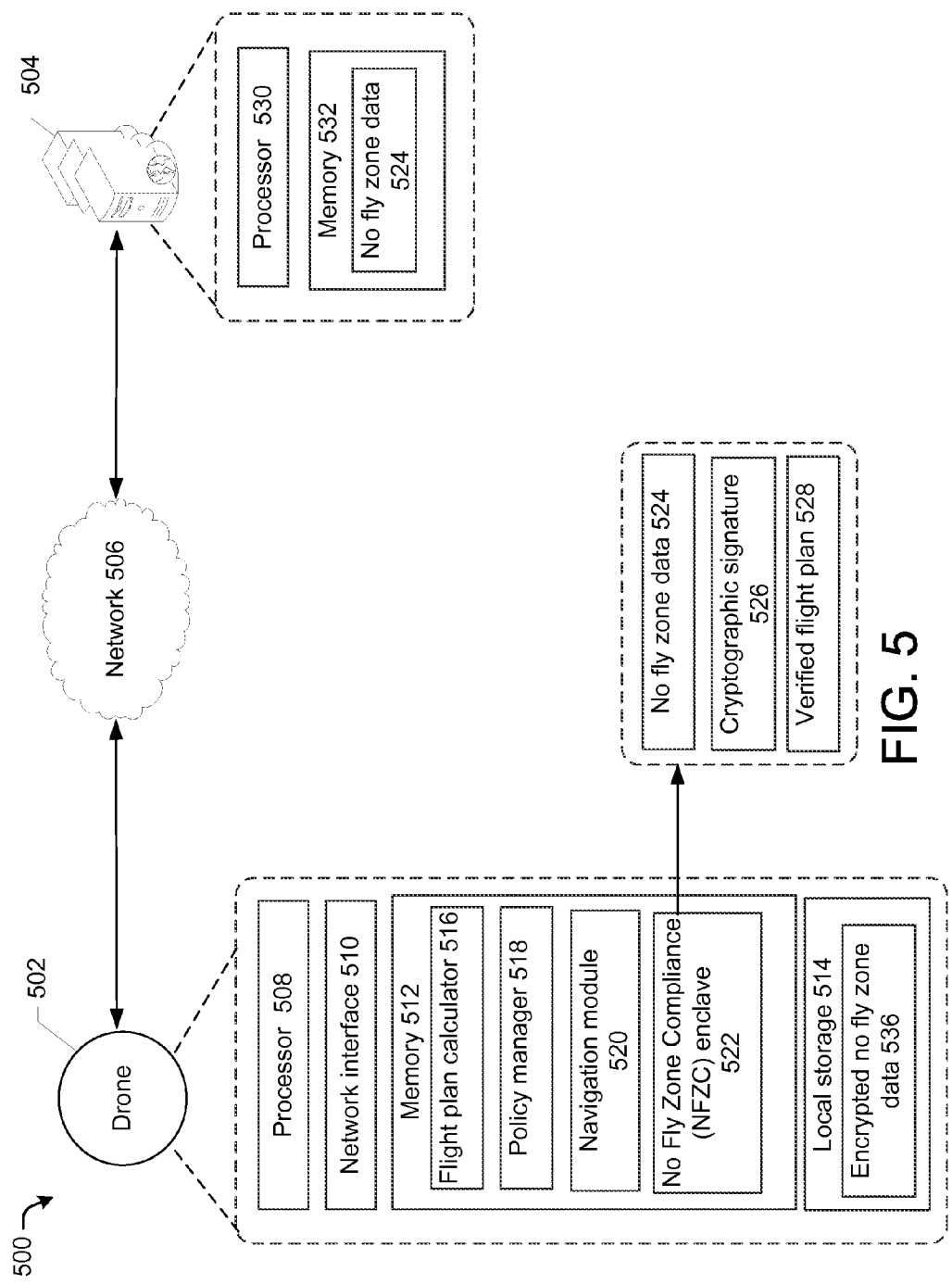
FIG. 5 is a schematic diagram of a drone implementing no-fly zone logic in accordance with an example embodiment of the disclosure.

In some environments, no-fly zones may be present that prohibit the flying of unmanned aerial vehicles in some airspace. As described below, embodiments of the disclosure may include an unmanned aerial vehicle having secure no-fly zone logic that prevents operation of the unmanned aerial vehicle and user circumvention of the prevention unless a flight plan has been verified against no-fly zone data. FIG. 5 depicts a system 500 having an unmanned aerial vehicle 502 implementing the no-fly zone logic described herein. The unmanned aerial vehicle 502 may be capable of autonomous flight, user-controlled flight or both. In some embodiments, as described further below, the unmanned aerial vehicle 502 may communicate with a server 504 via a network 506.

FIG. 5 depicts various components of the unmanned aerial vehicle 502, although it should be appreciated that various components are omitted and embodiments of the unmanned aerial vehicle 502 may include additional components not illustrated in FIG. 5. For example, some embodiments may include an unmanned aerial vehicle that implements both the unmanned aerial vehicle components and flight validation logic described above and illustrated in FIG. 1 and the unmanned aerial vehicle components and secure no-fly logic illustrated in FIG. 5 and described below.

As shown in FIG. 5, the unmanned aerial vehicle 502 may include a processor 508 (e.g., one or more processors), a network interface 510 (e.g., one or more interfaces) a memory 512 (e.g., one or more memories), and local storage 514 (e.g., one or more non-volatile memory devices that provide local storage of data). The processor 508 may be similar to the processor 112 described above and may execute various modules stored in the memory 512 and provide commands to the unmanned aerial vehicle 502, such as for navigation and flight.

The memory 512 may be similar to the memory 116 described above and may include various modules and other components for implementing the secure no-fly logic describe herein and for providing navigation of the unmanned aerial vehicle. For example, as shown in FIG. 5, the memory 512 may include a flight plan calculator 516, a policy manager 518, a navigation module 520, and no-fly zone compliance (NFZC) enclave 522. As used herein, the term "enclave" refers to a protected area in an address space of the memory 512, such that attempts to access the enclave memory area from modules or other software not resident in the enclave are prevented. In some embodiments, the NFZC enclave 522 may be implemented using an isolated execution software model, such as Software Guard Extensions (SGX) provided by Intel, Inc. of Santa Clara, Calif.

In some embodiments, the navigation module 520 may also be implemented using an enclave, such that the navigation module is protected from access via modules or other software not resident in its enclave. In other embodiments, the navigation module may be implemented in firmware using a secure boot technology, as described below. In yet other embodiments, the navigation module may be implemented using a protected service, such as a service implemented using a virtualization technology (VT).

The local storage 514 may include non-volatile memory, such as read-only memory (ROM), flash memory, a hard drive, other suitable optical, magnetic, or solid-state storage mediums, or any combination thereof. The memory 514 may store data files such as media (e.g., music and video files), software (e.g., for implementing functions on the unmanned aerial vehicle 502), wireless connection information, and any other suitable data.

The network interface 510 may include any number of interfaces for communication using suitable network (e.g., wireless networks, wired networks, or both) communication protocols and technologies. The network interface 510 may implement any suitable communications standard, protocol and technology, Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), voice over Internet Protocol (VoIP), Wi-Max, or any other suitable communications standards, protocols, and technologies.

The flight plan calculator 516 may calculate a flight plan from received data (e.g., one or more locations such as an origin, a destination, waypoints, etc.). For example, a user may input one or more locations and the flight plan calculator 516 may calculate a flight plan using a map, satellite-based positioning data, or other data. The policy manager 518 may provide for policy enforcement of various flight policies, such as flight policies specific to the unmanned aerial vehicle type, the flight plan, etc. For example, such policy enforcement may include the enforcement of no camera zones, altitude restrictions, range restrictions, speed limits, etc.

As described further below, the NFZC enclave 522 may securely obtain and store no-fly zone data 524. In some embodiments, the no-fly zone data may include geographic identification of no-fly zones in a geographic area. Using the no-fly zone data 524, the NFZC enclave 522 may verify compliance of a flight plan (calculated by the flight plan calculator 516) with the no-fly zone data. For example, the NFZC enclave 522 may compare the geographic path of a flight plan with no-fly zones to determine whether the flight plan violates a no-fly zone. If the flight plan does not violate a no-fly zone, the NFZC enclave 522 may verify the flight plan for use by the navigation module. In some embodiments, the NFZC enclave may also annotate a flight plan with policies such as no camera zones, altitude restrictions, range restrictions, speed limits, etc.

The NFZC enclave 522 may also include a cryptographic signature 526 for signing verified flight plans. The cryptographic signature 526 may be implemented using any number of and suitable encryption algorithm, including asymmetric encryption algorithms such as RSA, Diffie-Hellman, Digital Signature Standard (DSS), elliptical curve cryptography (ECC). A verified flight plan 528 may be signed using a cryptographic signature and, after verification, may be provided to the navigation module 520 for use in flying the unmanned aerial vehicle. The navigation module 520 may include verification logic that verifies the cryptographic signature 526, such that the navigation module 520 only executed flight plans signed by the NFZC enclave 522.

In some embodiments, the NFZC enclave 522 may obtain the no-fly zone data 524 from the server 504. For example, the NFZC enclave 522 may send transmit a request for no-fly zone data (e.g., new or updated no-fly zone data) to the server 504. The server 504 may include a processor 530 and a storage 532 that stores no-fly zone data for geographic areas (e.g., no-fly zone data 524). The server 504 may be a single server (in a discrete hardware component or as a virtual server) or multiple servers. The server 504 may include web servers, application servers, or other types of servers. Additionally, the server 504 may be, for example, computers arranged in any physical and virtual configuration, such as computers in one or more data processing centers, a distributed computing environment, or other configuration. Such configurations may use the network 506 for communication or may communicate over other networks.

The unmanned aerial vehicle 502 and the server 504 are in communication with the network 506, such as through a wired or wireless network interface. In some embodiments, the network 506 may include multiple networks, and may include any suitable network and networking technology, such as the Internet, an intranet, a local area network (LAN), a wide area network (WAN), or any other suitable network. Additionally, the network 506 may include a wired network, a wireless network, or both. Moreover, it should be appreciated that the unmanned aerial vehicle 502 and the server 504 may communicate over different networks separately and simultaneously. For example, the unmanned aerial vehicle 502 may communicate over both a wireless Ethernet network and a cellular network.

Upon receiving a request for no-fly zone data from an unmanned aerial vehicle 502, the server 504 may transmit a response having no-fly zone data (e.g., new or updated no-fly zone data) to the unmanned aerial vehicle 502. In some embodiments, the NFZC enclave 522 may encrypt the received no-fly zone data 524 and store the encrypted no-fly zone data 536 on local storage 514. In some embodiments, if the NFZC enclave 522 is unable to communicate with the server 504 to obtain no-fly zone data, the NFZC enclave 522 may use the stored no-fly zone data 536 to verify a flight plan.

Figure 6:
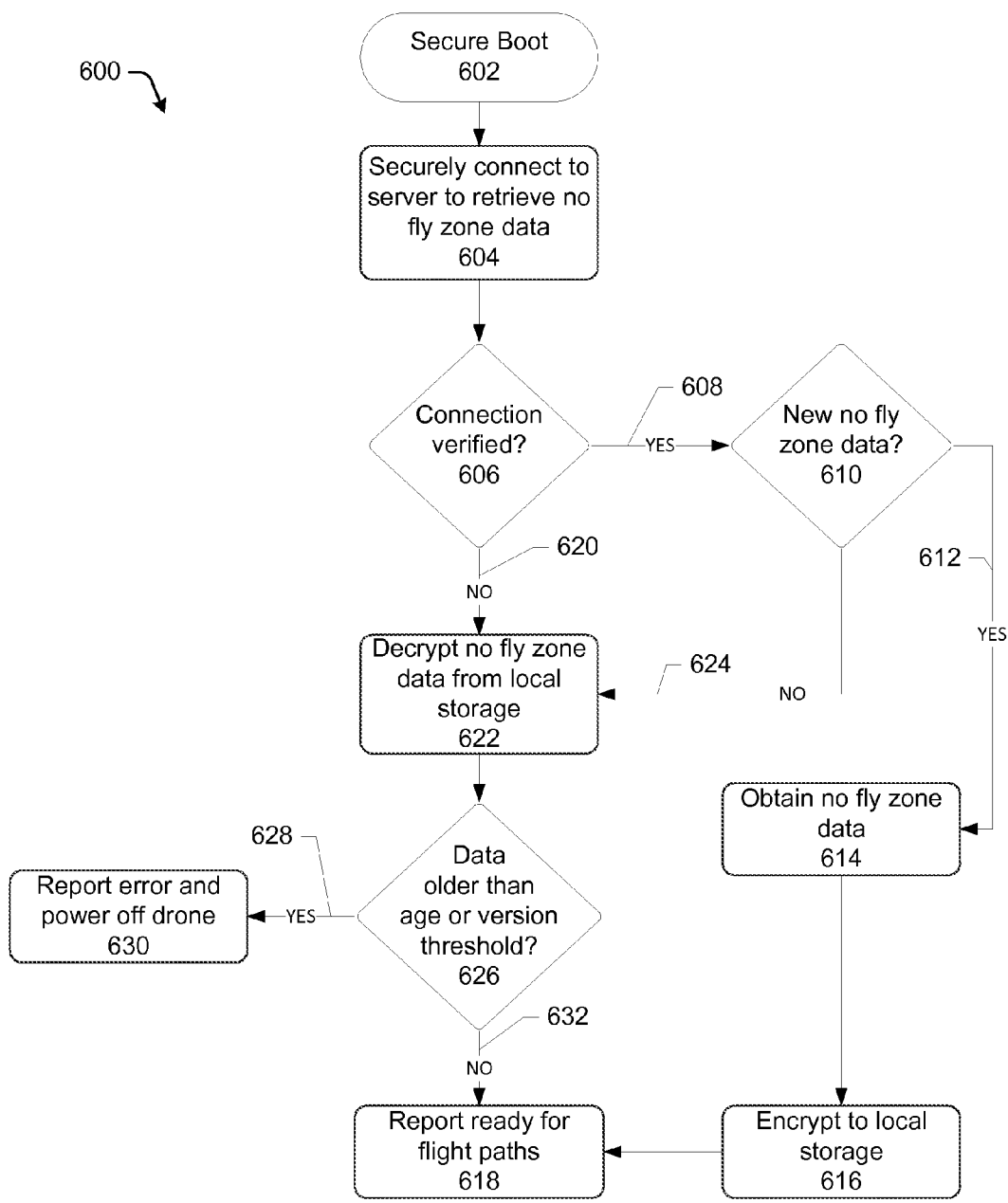
FIG. 6 is a block diagram of a process for the initialization of an implementation of secure no-fly zone logic in accordance with an embodiment of the disclosure.

FIG. 6 depicts a process 600 for the initialization of an NFZC enclave in accordance with an embodiment of the disclosure. Initially, an unmanned aerial vehicle may be powered on using a secure boot process (block 602). In some embodiments, the secure boot process may be implemented using the unified extensible firmware interface (UEFI). In some embodiments, the secure boot process may enable the execution of software (e.g., an operating system, software modules) associated with valid credentials but disallow the execution of software without valid credentials. In some embodiments, the credentials may include a digital signature (which may refer to or include a cryptographic signature).

After boot-up, a secure connection to a server may be attempted to retrieve no-fly zone data (block 604), and the connection may be verified (block 606). In some embodiments, the secure connection may include a connection using the Transport Layer Security (TLS) protocol and the Secure Sockets Layer (SSL) protocol (in some embodiments, the SSL and TSL designations may refer to the same protocol). In some embodiments, the secure connection may be implemented using a pinned certificate, a remote attestation (e.g., implemented using SGX provided by Intel, Inc. of Santa Clara, Calif., other security protocols or techniques, or any combination thereof.

If the connection is verified (line 608), a determination of whether the no-fly zone data is or includes new data may be performed (block 610). For example, in some embodiments the determination may be performed by comparing a version number of the no-fly zone data stored on the unmanned aerial vehicle with a version number of the no-fly zone data available from the server. If the no-fly zone data is or includes new data (line 612), the no-fly zone data may be obtained (block 614). The obtained no-fly zone data is then encrypted and stored on local storage (block 616) and the NFCZ enclave may report that it is ready to validate flight paths (block 618).

If the connection to the server is not verified (line 620), the no-fly zone data previously encrypted and stored on local storage may be decrypted (block 622) for use by the NFZC enclave. Similarly, if the no-fly zone data on the server is not or does not include new data (line 624), the no-fly zone data previously encrypted and stored on local storage may be decrypted (block 622) for use by the NFZC enclave.

In some embodiments, the age or version of the no-fly zone data previously encrypted and stored on local storage may be evaluated against an age or version threshold (block 626) (e.g., by evaluating a timestamp associated with the no-fly zone data against the current date to determine the age of the no-fly zone data, by evaluating a version number of the no-fly zone data, etc.). If the no-fly zone data is older than the age or version threshold (line 628), an error may be reported and the unmanned aerial vehicle may be powered off or otherwise disabled (block 630). If the no-fly zone data is less than the age threshold (line 632), the NFCZ enclave may report that it is ready to validate flight paths (block 618).

Figure 7:
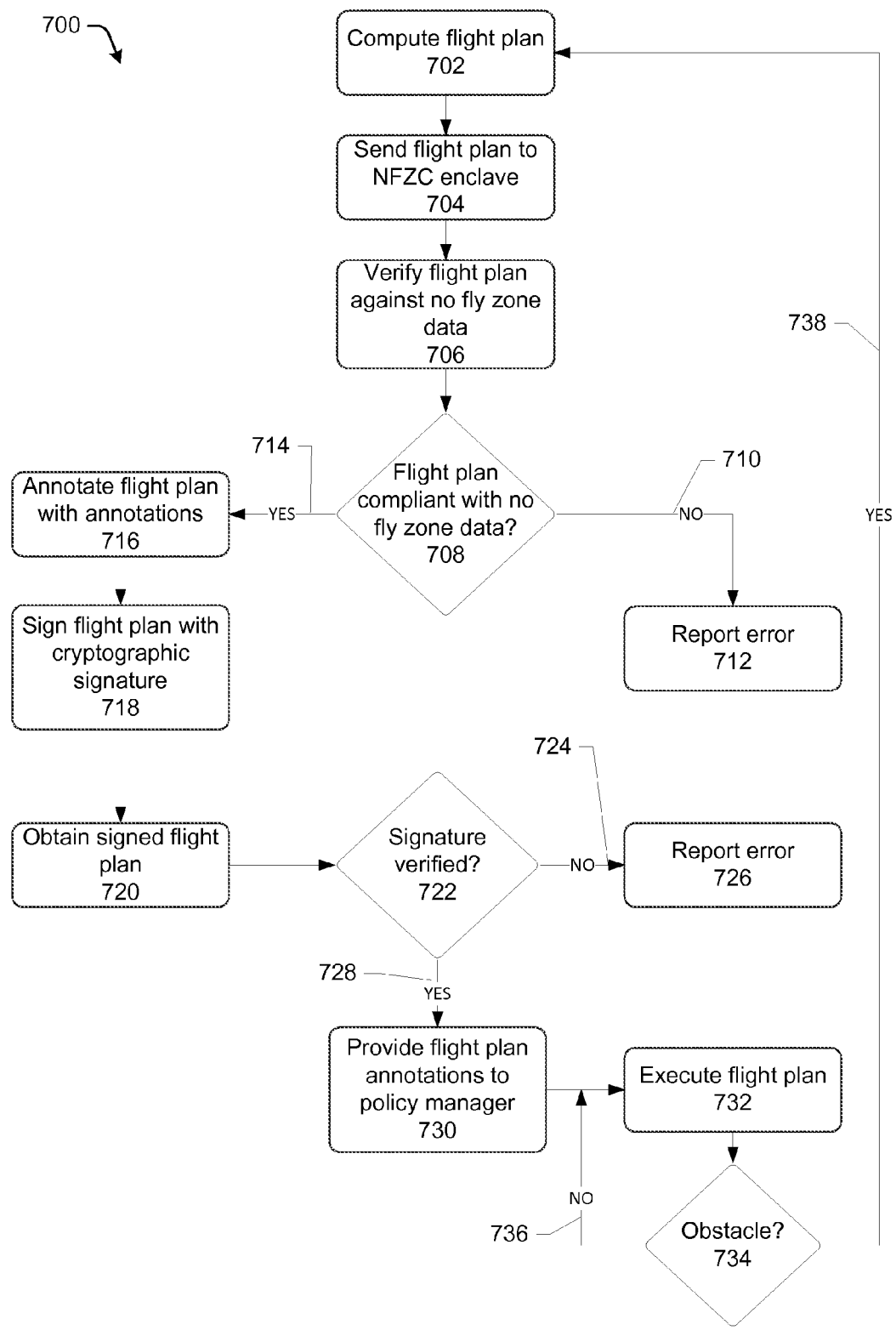
FIG. 7 is a block diagram of a process for verifying and using a flight plan with an implementation of secure no-fly logic described herein in accordance with an example embodiment of the disclosure.

FIG. 7 depicts a process 700 for verifying and using a flight plan with the secure no-fly logic described herein in accordance with an example embodiment of the disclosure. As shown in FIG. 7, various portions of the process 700 may be performed by the flight path calculator module 702, the NFZC enclave 704, and the navigator module 706. However, in other embodiments the process 700 may be distributed differently across such modules or using different modules or arrangements thereof.

Initially, a flight plan may be calculated (block 702), such as by the flight plan calculator module described above, and the calculated flight plan may be sent to the NFZC enclave (block 704). Next, the NFZC enclave may verify the flight plan against the no-fly zone data (block 706), such as the no-fly zone data obtained during the initialization of the NFZC enclave described above and illustrated in FIG. 5 to determine whether the flight plan is compliant with the known no-fly zones (block 708). If the flight plan is not compliant with the no-fly zones (line 710), an error may be reported (block 712). In some embodiments, the flight plan calculator module may recalculate a flight plan in an attempt to avoid no-fly zones. In some embodiments, the error report may include no-fly zone data that enables a user to resubmit locations or a flight plan that attempts to avoid the no-fly zones.

If the flight plan is compliant with the known no-fly zones in the no-fly zone data (line 714), the flight plan may be annotated with known policies (block 716) and signed with the NFZC enclave's cryptographic signature (block 718) e.g., a binary large object (blob) that includes the flight plan may be signed with the cryptographic signature. In some embodiments, upon validation, the flight plan may be annotated with other information such as no camera zones, speed limited zones, etc.

The signed flight plan may be obtained by the navigator module (block 720) and, in some embodiments, the cryptographic signature may be verified (block 722). For example, in some embodiments the cryptographic signature may be implemented using asymmetric cryptography such that the navigation module includes or has access to a public key for decrypting a signed flight plan encrypted by the NFZC enclave's private key. However, in other embodiments other cryptographic signing and verification techniques may be used.

If the cryptographic signature is unable to be verified (line 724), an error may be reported (block 726). If the cryptographic signature is verified (line 728), the flight plan annotations associated with the flight plan may be provided to a policy manager (block 730). As described above, the policy manager may implement and enforce policies associated with a flight plan, such as by shutting off a camera when the unmanned aerial vehicle is in a no-fly zone, etc. The verified flight plan may be executed by the navigation module (block 732) to enable flying of the unmanned aerial vehicle using the flight plan. In some embodiments, an obstacle may be encountered during the flight of unmanned aerial vehicle (block 734) that may result in a re-route of the unmanned aerial vehicle's flight. If no obstacle is encountered (line 736), the verified flight plan may continue to be executed (block 730) such that the unmanned aerial vehicle maintains flight according to the verified flight plan. If an obstacle is encountered during flight (line 738), a new flight plan may be calculated (block 702) and re-verified according to the process 700 described above.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Further Embodiments

In a first example embodiment there is disclosed a non-transitory computer-readable medium storing computer-executable instructions. When executed by a processor, the computer-executable instructions cause the processor to perform operations that include obtaining a location of an unmanned aerial vehicle engaged in autonomous flight. The location may be determined from a satellite-based navigation system. When executed by a processor, the computer-executable instructions further cause the processor to perform operations that include determining location data from one or more sources accessible by the unmanned aerial vehicle. The one or more sources may include at least one of a broadcast beacon, a wireless network identifier, a cellular tower, and a visual marker. When executed by a processor, the computer-executable instructions further cause the processor to perform operations that include comparing the location data to the location and initiating an action based on the comparison. The action may include landing of the unmanned aerial vehicle, returning the unmanned aerial vehicle to a previously determined location, returning the unmanned aerial vehicle to a base station associated with the unmanned aerial vehicle, requesting user control of the unmanned aerial vehicle, or initiating self-destruction of the unmanned aerial vehicle.

In some embodiments, when executed by a processor, the computer-executable instructions further cause the processor to perform operations that include determining a range associated with the location data, determining a source location of the one or more sources of the location data, determining a distance between the location and the source location, and comparing the range to the distance. In some embodiments, when executed by a processor, the computer-executable instructions further cause the processor to perform operations that include determining a source location of the one or more sources of the location data from a map that includes respective locations of the one or more sources and determining a distance between the source location and the location, and comparing the distance to a distance threshold.

In some embodiments, when executed by a processor, the computer-executable instructions further cause the processor to perform operations that include obtaining the visual marker from images or video captured by a camera of the unmanned aerial vehicle. In some embodiments, the one or more sources may further include the base station. In some embodiments, when executed by a processor, the computer-executable instructions further cause the processor to perform operations that include determining a distance between a location of the base station and the location and comparing the distance to the range of the base station.

In a second example embodiment there is disclosed an unmanned aerial vehicle having a processor and a non-transitory computer-readable memory storing computer-executable instructions. When executed by a processor, the computer-executable instructions cause the processor to perform operations that include obtaining a location of the unmanned aerial vehicle engaged in autonomous flight. The location may be determined from a satellite-based navigation system. When executed by a processor, the computer-executable instructions further cause the processor to perform operations that include determining location data from one or more sources accessible by the unmanned aerial vehicle. The one or more sources may include at least one of a broadcast beacon, a wireless network identifier, a cellular tower, and a visual marker. When executed by a processor, the computer-executable instructions further cause the processor to perform operations that include comparing the location data to the location and initiating an action based on the comparison. The action may include landing of the unmanned aerial vehicle, returning the unmanned aerial vehicle to a previously determined location, returning the unmanned aerial vehicle to a base station associated with the unmanned aerial vehicle, requesting user control of the unmanned aerial vehicle, or initiating self-destruction of the unmanned aerial vehicle.

In some embodiments, when executed by a processor, the computer-executable instructions further cause the processor to perform operations that include determining a range associated with the location data, determining a source location of the one or more sources of the location data, determining a distance between the location and the source location, and comparing the range to the distance. In some embodiments, when executed by a processor, the computer-executable instructions further cause the processor to perform operations that include determining a source location of the one or more sources of the location data from a map that includes respective locations of the one or more sources and determining a distance between the source location and the location, and comparing the distance to a distance threshold.

In some embodiments, when executed by a processor, the computer-executable instructions further cause the processor to perform operations that include obtaining the visual marker from images or video captured by a camera of the unmanned aerial vehicle. In some embodiments, the one or more sources may further include the base station. In some embodiments, when executed by a processor, the computer-executable instructions further cause the processor to perform operations that include determining a distance between a location of the base station and the location and comparing the distance to the range of the base station.

In a third example embodiment there is disclosed a non-transitory computer-readable medium storing computer-executable instructions. When executed by a processor, the computer-executable instructions cause the processor to perform operations that include receiving a flight plan for an unmanned aerial vehicle, the flight plan including a flight path over a geographic area and comparing the flight path to one or more geographically identified no-fly zones. When executed by a processor, the computer-executable instructions cause the processor to perform operations that include determining that the flight path does not enter the one or more geographically identified no-fly zones, associating the flight plan with a cryptographic signature, and providing the flight plan for execution by the unmanned aerial vehicle.

In some embodiments, when executed by a processor, the computer-executable instructions further cause the processor to perform operations that include executing the flight plan after verifying the cryptographic signature. In some embodiments, associating the flight plan with a cryptographic signature includes signing a data object that includes the flight plan with the cryptographic signature. In some embodiments, the non-transitory computer-readable medium is a volatile memory of the unmanned aerial vehicle and the one or more geographically identified no-fly zones and the cryptographic signature are stored in a protected area in an address space of the memory. In some embodiments, when executed by a processor, the computer-executable instructions further cause the processor to perform operations that include annotating the flight plan with one or more policies along the flight path. The one or more policies may include at least one of a no camera zone, an altitude restriction, a range restriction, and a speed limit. In some embodiments, when executed by a processor, the computer-executable instructions further cause the processor to perform operations that include establishing a connection to a server and receiving the one or more geographically identified no-fly zones from the server. In some embodiments, when executed by a processor, the computer-executable instructions further cause the processor to perform operations that include determining an age associated one or more geographically identified no-fly zones and determining that the age is less than an age threshold.

In a fourth example embodiment there is disclosed an unmanned aerial vehicle having a processor and a non-transitory computer-readable memory storing computer-executable instructions. When executed by a processor, the computer-executable instructions cause the processor to perform operations that include receiving a flight plan for an unmanned aerial vehicle, the flight plan including a flight path over a geographic area and comparing the flight path to one or more geographically identified no-fly zones. When executed by a processor, the computer-executable instructions cause the processor to perform operations that include determining that the flight path does not enter the one or more geographically identified no-fly zones, associating the flight plan with a cryptographic signature, and providing the flight plan for execution by the unmanned aerial vehicle.

In some embodiments, when executed by a processor, the computer-executable instructions further cause the processor to perform operations that include executing the flight plan after verifying the cryptographic signature. In some embodiments, associating the flight plan with a cryptographic signature includes signing a data object that includes the flight plan with the cryptographic signature. In some embodiments, the non-transitory computer-readable medium is a volatile memory of the unmanned aerial vehicle and the one or more geographically identified no-fly zones and the cryptographic signature are stored in a protected area in an address space of the memory. In some embodiments, when executed by a processor, the computer-executable instructions further cause the processor to perform operations that include annotating the flight plan with one or more policies along the flight path. The one or more policies may include at least one of a no camera zone, an altitude restriction, a range restriction, and a speed limit. In some embodiments, when executed by a processor, the computer-executable instructions further cause the processor to perform operations that include establishing a connection to a server and receiving the one or more geographically identified no-fly zones from the server. In some embodiments, when executed by a processor, the computer-executable instructions further cause the processor to perform operations that include determining an age associated one or more geographically identified no-fly zones and determining that the age is less than an age threshold.

In a fifth example embodiment there is disclosed a method that includes obtaining a location of an unmanned aerial vehicle engaged in autonomous flight. The location may be determined from a satellite-based navigation system. The method further includes determining location data from one or more sources accessible by the unmanned aerial vehicle. The one or more sources may include at least one of a broadcast beacon, a wireless network identifier, a cellular tower, and a visual marker. The method also includes comparing the location data to the location and initiating an action based on the comparison. The action may include landing of the unmanned aerial vehicle, returning the unmanned aerial vehicle to a previously determined location, returning the unmanned aerial vehicle to a base station associated with the unmanned aerial vehicle, requesting user control of the unmanned aerial vehicle, or initiating self-destruction of the unmanned aerial vehicle.

In some embodiments, the method includes determining a range associated with the location data, determining a source location of the one or more sources of the location data, determining a distance between the location and the source location, and comparing the range to the distance. In some embodiments, the method includes determining a source location of the one or more sources of the location data from a map including respective locations of the one or more sources and determining a distance between the source location and the location, and comparing the distance to a distance threshold.

In some embodiments, the method includes obtaining the visual marker from images or video captured by a camera of the unmanned aerial vehicle. In some embodiments, the one or more sources may further include the base station. In some embodiments, the method includes determining a distance between a location of the base station and the location and comparing the distance to the range of the base station.

In a sixth example embodiment there is disclosed an unmanned aerial vehicle having means for obtaining a location of the unmanned aerial vehicle engaged in autonomous flight. The location may be determined from a satellite-based navigation system. The unmanned aerial vehicle further includes means for determining location data from one or more sources accessible by the unmanned aerial vehicle. The one or more sources may include at least one of a broadcast beacon, a wireless network identifier, a cellular tower, and a visual marker. The unmanned aerial vehicle also includes means for comparing the location data to the location and initiating an action based on the comparison. The action may include landing of the unmanned aerial vehicle, returning the unmanned aerial vehicle to a previously determined location, returning the unmanned aerial vehicle to a base station associated with the unmanned aerial vehicle, requesting user control of the unmanned aerial vehicle, or initiating self-destruction of the unmanned aerial vehicle.

In some embodiments, the unmanned aerial vehicle includes means for determining a range associated with the location data, determining a source location of the one or more sources of the location data, determining a distance between the location and the source location, and comparing the range to the distance. In some embodiments, the unmanned aerial vehicle includes means for determining a source location of the one or more sources of the location data from a map having respective locations of the one or more sources, means for determining a distance between the source location and the location, and means for comparing the distance to a distance threshold.

In some embodiments, when executed by a processor, the unmanned aerial vehicle includes means for obtaining the visual marker from images or video captured by a camera of the unmanned aerial vehicle. In some embodiments, the one or more sources may further include the base station. In some embodiments, the unmanned aerial vehicle includes means for determining a distance between a location of the base station and the location and comparing the distance to the range of the base station.

In a seventh example embodiment there is disclosed a method that includes receiving a flight plan for an unmanned aerial vehicle, the flight plan including a flight path over a geographic area and comparing the flight path to one or more geographically identified no-fly zones. The method further includes determining that the flight path does not enter the one or more geographically identified no-fly zones, associating the flight plan with a cryptographic signature, and providing the flight plan for execution by the unmanned aerial vehicle.

In some embodiments, the method includes executing the flight plan after verifying the cryptographic signature. In some embodiments, associating the flight plan with a cryptographic signature includes signing a data object that includes the flight plan with the cryptographic signature. In some embodiments, the method includes creating a protected area in an address space of a memory of the unmanned aerial vehicle and storing the one or more geographically identified no-fly zones and the cryptographic signature in the protected area in the address space of the memory. In some embodiments, the method includes annotating the flight plan with one or more policies along the flight path. The one or more policies may include at least one of a no camera zone, an altitude restriction, a range restriction, and a speed limit. In some embodiments, the method includes establishing a connection to a server and receiving the one or more geographically identified no-fly zones from the server. In some embodiments, the method includes determining an age associated one or more geographically identified no-fly zones and determining that the age is less than an age threshold.

In an eight example embodiment there is disclosed an unmanned aerial vehicle includes means for receiving a flight plan for an unmanned aerial vehicle, the flight plan including a flight path over a geographic area and comparing the flight path to one or more geographically identified no-fly zones. An unmanned aerial vehicle further includes means for determining that the flight path does not enter the one or more geographically identified no-fly zones, means for associating the flight plan with a cryptographic signature, and means for providing the flight plan for execution by the unmanned aerial vehicle.

In some embodiments, the unmanned aerial vehicle includes means for executing the flight plan after verifying the cryptographic signature. In some embodiments, associating the flight plan with a cryptographic signature includes signing a data object that includes the flight plan with the cryptographic signature. In some embodiments, the unmanned aerial vehicle includes means for annotating the flight plan with one or more policies along the flight path. The one or more policies may include at least one of a no camera zone, an altitude restriction, a range restriction, and a speed limit. In some embodiments, the unmanned aerial vehicle includes means for establishing a connection to a server and receiving the one or more geographically identified no-fly zones from the server. In some embodiments, the unmanned aerial vehicle includes means for determining an age associated one or more geographically identified no-fly zones and means for determining that the age is less than an age threshold.

The invention claimed is:

1. A non-transitory computer-readable medium comprising computer-executable instructions that, when executed by a processor, cause the processor to perform operations including:
    obtaining a location of an unmanned aerial vehicle engaged in autonomous flight, the location determined from a satellite-based navigation system;
    determining location data from one or more sources accessible by the unmanned aerial vehicle, the one or more sources including at least one of a broadcast beacon, a wireless network identifier, a cellular tower, and a visual marker;
    comparing the location data to the location by:
    determining a range associated with the location data;
    determining a source location of the one or more sources of the location data;
    determining a distance between the location and the source location; and
    comparing the range to the distance; and
    initiating an action based on the comparison, the action including: landing of the unmanned aerial vehicle, returning the unmanned aerial vehicle to a previously determined location, returning the unmanned aerial vehicle to a base station associated with the unmanned aerial vehicle, requesting user control of the unmanned aerial vehicle, or initiating self-destruction of the unmanned aerial vehicle.

2. The non-transitory computer-readable medium of claim 1, wherein comparing the location data to the location further includes:
    determining a source location of the one or more sources of the location data from a map comprising respective locations of the one or more sources; and determining a distance between the source location and the location; and comparing the distance to a distance threshold.

3. The non-transitory computer-readable medium of claim 1, further including obtaining the visual marker from images or video captured by a camera of the unmanned aerial vehicle.

4. The non-transitory computer-readable medium of claim 1, wherein the one or more sources further includes the base station.

5. The non-transitory computer-readable medium of claim 4, the operations further including:
determining a distance between a location of the base station and the location; and
comparing the distance to the range of the base station.

6. An unmanned aerial vehicle, comprising:
a processor;
a computer-readable memory including computer-executable instructions that, when executed by the processor, cause the processor to perform operations including:
obtaining a location of the unmanned aerial vehicle while engaged in autonomous flight, the location determined from a satellite-based navigation system;
determining location data from one or more sources accessible by the unmanned aerial vehicle, the one or more sources including at least one of a broadcast beacon, a wireless network identifier, a cellular tower, and a visual marker;
comparing the location data to the location by:
determining a range associated with the location data;
determining a source location of the one or more sources of the location data;
determining a distance between the location and the source location; and
comparing the range to the distance; and
initiating an action based on the comparison, the action including: landing of the unmanned aerial vehicle, returning the unmanned aerial vehicle to a previously determined location, returning the unmanned aerial vehicle to a base station associated with the unmanned aerial vehicle, requesting user control of the unmanned aerial vehicle, or initiating self-destruction of the unmanned aerial vehicle.

7. The unmanned aerial vehicle of claim 6, wherein comparing the location data to the location includes:
determining a source location of the one or more sources of the location data from a map comprising respective locations of the one or more sources; and
determining a distance between the source location and the location; and comparing the distance to a distance threshold.

8. The unmanned aerial vehicle of claim 6, further including obtaining the visual marker from images or video capture by a camera of the unmanned aerial vehicle.

9. The unmanned aerial vehicle of claim 6, wherein the one or more sources further include the base station.

10. The unmanned aerial vehicle of claim 9, the operations further including:
determining a distance between a location of the base station and the location; and
comparing the distance to the range of the base station.

* * * * *